United States Patent [19]

Keady

[11] 3,834,162

[45] Sept. 10, 1974

[54] CONTROL VALUE FOR MOTOR VEHICLE FLUID POWER CIRCUIT

[75] Inventor: Frederick D. Keady, Arlington, Mass.

[73] Assignee: The Weatherhead Company, Cleveland, Ohio

[22] Filed: Apr. 23, 1973

[21] Appl. No.: 353,248

[52] U.S. Cl. .................... 60/418, 137/119, 137/118
[51] Int. Cl. ............................................ G05d 11/00
[58] Field of Search ....... 60/418, 413; 137/118, 119

[56] References Cited
UNITED STATES PATENTS

| | | | |
|---|---|---|---|
| 3,575,192 | 4/1971 | MacDuff | 137/118 |
| 3,587,619 | 6/1971 | Krechel | 137/119 |
| 3,640,301 | 2/1972 | Jania | 60/418 |

FOREIGN PATENTS OR APPLICATIONS

| | | | |
|---|---|---|---|
| 1,188,383 | 12/1957 | France | 137/119 |

*Primary Examiner*—Edgar W. Geoghegan
*Assistant Examiner*—A. M. Zupcic
*Attorney, Agent, or Firm*—McNenny, Farrington, Pearne & Gordon

[57] ABSTRACT

A motor vehicle fluid power circuit is disclosed which includes a constant displacement pump driven by the engine of the vehicle, a control valve, an open center steering valve, a brake booster accumulator, and a closed center brake booster. The entire output of the pump flows through the control valve under all conditions, and the control valve selectively directs the pump output to the steering valve to assist in steering the vehicle or to the brake booster accumulator (which is hydraulically connected to the brake booster) to assist in braking.

14 Claims, 4 Drawing Figures

CONTROL VALVE FOR MOTOR VEHICLE FLUID POWER CIRCUIT

BACKGROUND OF THE INVENTION

This invention relates generally to a hydraulic fluid power circuit, and more particularly to a motor vehicle hydraulic fluid power circuit having a hydraulic pump for supplying fluid to assist the operator in steering and braking the vehicle.

Motor vehicles are frequently provided with a hydraulic pump which is driven by the engine of the vehicle to provide a source of fluid power. The hydraulic pump may be a constant displacement pump which provides a constant output for any shaft speed, and the output of the pump may be hydraulically connected to a control valve which selectively directs the pump output to a steering valve to assist in steering the vehicle or to a brake booster accumulator to assist in braking. The control valve normally directs the pump output to the steering valve when the accumulator is fully charged and directs the pump output to the accumulator when the accumulator pressure is depleted below a minimum charge pressures. Additionally, the control valve may also interrupt charging of the accumulator and direct the pump output to the steering valve is the steering valve is actuated while the accumulator is being charged, so that the entire pump output is available to the steering valve at all times.

The steering valve of the circuit is an open center steering valve which directs the fluid which it receives from the pump to a drain line when the steering valve is in a neutral or centered position, and which directs at least a portion of such fluid to a power steering fluid motor when the valve is moved from its center position. The brake booster of the circuit is a closed center device which utilizes the fluid from the accumulator to apply a force to the brake system master cylinder in response to an input force on the brake pedal of the vehicle.

The brake booster accumulator provides reserve capacity for the brake booster in the event of failure of the fluid power supply, and minimizes the output requirements of the pump by permitting the pump to be used for charging the accumulator when the pump output is not otherwise required for steering purposes. The circuit permits standardization of components, since the circuit utilizes a constant displacement hydraulic pump and an open center steering valve of the type which are used in circuits that do not include an accumulator or a hydraulically actuated brake booster.

SUMMARY OF THE INVENTION

The present invention provides a motor vehicle fluid power circuit which includes a constant displacement pump, an open center steering valve, an accumulator, a brake booster, and a control valve. The entire output of the pump is directed to the control valve, and the control valve selectively directs the pump output to the steering valve or to the accumulator. The accumulator is hydraulically connected to provide a constant source of high pressure fluid to the brake booster.

The control valve which is provided by the present invention for selectively directing the pump output to the steering valve or to the accumulator includes an inlet port for receiving fluid from the pump, a first outlet port for supplying fluid to the steering valve, and a second outlet port for supplying fluid to the accumulator. A first passage establishes fluid pressure communication between the inlet port and the first outlet port, and a second passage establishes fluid pressure communication between the inlet port and the second outlet port. A loading spool is movable between an open position for opening the first passage and a closed position for closing the first passage and is spring biased to the closed position. A differential area unloading spool is slidably disposed in a bore in the control valve housing and includes a smaller diameter end exposed to fluid inlet port pressure and a larger diameter end exposed to accumulator pressure and an intermediate differential area exposed to atmospheric pressure. The unloading spool is movable in the bore by application of a predetermined pressure in the inlet port and in the accumulator to its smaller and larger diameter ends, respectively, to move the loading spool against the bias of the spring from the closed position to the open position. In this manner, the unloading spool opens the first passage to direct the entire output of the pump to the steering valve when the accumulator is charged.

The control valve also includes a priority device which interrupts the charging cycle of the accumulator and directs the entire output of the pump to the steering valve when the accumulator is being charged and the steering valve is moved from its center or neutral position. In a first embodiment, this is accomplished by a differential area priority piston having a larger diameter end exposed to steering valve pressure and a smaller diameter end exposed to accumulator pressure so that an increase in the steering valve pressure displaces the priority piston to close the second passage to the accumulator. This causes the fluid from the pump to move the loading spool from the closed position to the open position to open the first passage to the steering valve. In a second embodiment, this is accomplished by a priority piston having one end exposed to steering valve pressure and the other end exposed to atmospheric pressure so that an increase in steering valve pressure moves the priority piston to close the second passage to the accumulator and to open a bypass passage around the loading spool to the steering valve.

BRIEF DESCRIPTION OF THE DRAWINGS

These and other aspects and advantages of the present invention are incorporated in the embodiments of the invention shown in the drawings, wherein.

DESCRIPTION OF THE PREFERRED EMBODIMENTS

Fluid Power Circuit

Figure 1:
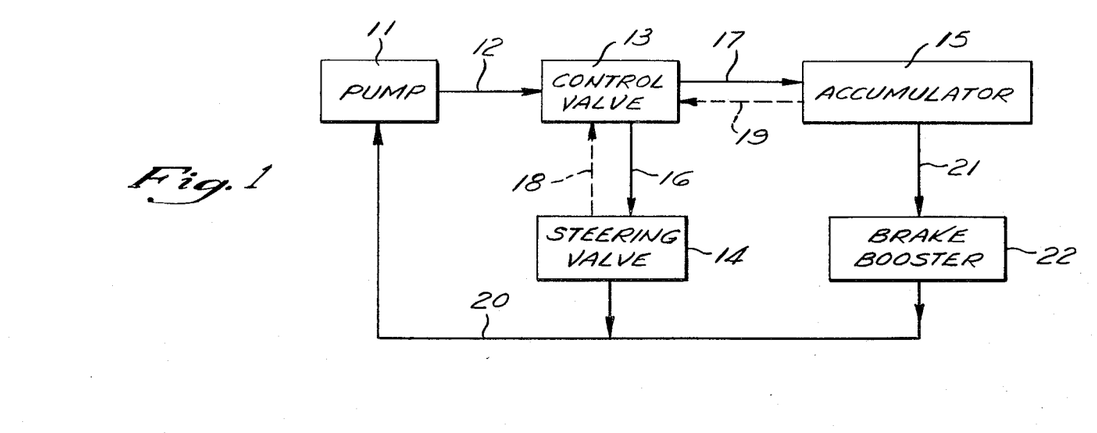
FIG. 1 is a schematic circuit diagram of the motor vehicle fluid power circuit according to the principles of the invention.

Referring now to the drawings in greater detail, FIG. 1 is a schematic circuit diagram of a motor vehicle fluid power circuit incorporating the principles of the invention.

The circuit shown in FIG. 1 includes a hydraulic pump 11 providing a source of fluid power for the circuit. The pump 11 is driven by the engine of the motor vehicle (not shown), and in the preferred embodiment the pump 11 is a constant displacement pump of the type commonly used in motor vehicle power steering systems at the present time.

A suitable line 12 carries the entire output of the pump 11 to control valve 13. The control valve 13, as discussed in detail below with particular reference to FIGS. 2 and 3, selectively directs the fluid which it receives from the pump 11 to either a steering valve 14 or to an accumulator 15 through lines 16 or 17, respectively. The dotted lines 18 and 19 illustrate that feedback signals are transmitted from the steering valve 14 and the accumulator 15 to the control valve 13 as also discussed below with particular reference to FIGS. 2 and 3.

The steering valve 14 is an open center steering valve of the type conventionally used in automobiles. The steering valve 14 directs the fluid which it receives back to the pump 11 through a drain line 20 when the steering valve is in its neutral or center position. When fluid power from the pump 11 is required to assist in the steering of the vehicle and the steering valve 14 is displaced from its center position, the steering valve 14 directs at least some of the fluid received through the line 16 to the fluid motors of the motor vehicle power steering system in a well known manner.

The accumulator 15, as described in detail below with reference to FIGS. 2 and 3, stores fluid which it receives through line 17 for use when the brakes of the motor vehicle are actuated. When the brakes are actuated, the accumulator 15 supplies high pressure hydraulic fluid through the line 21 to the brake booster 22.

The brake booster 22, as described below with particular reference to FIG. 4, utilizes the fluid which it receives through the line 21 to assist the operator in braking the motor vehicle. When the brakes of the vehicle are released, the brake booster 22 directs the fluid which it has received back to the pump 11 through the drain line 20.

First Embodiment of Control Valve and Accumulator

Figure 2:
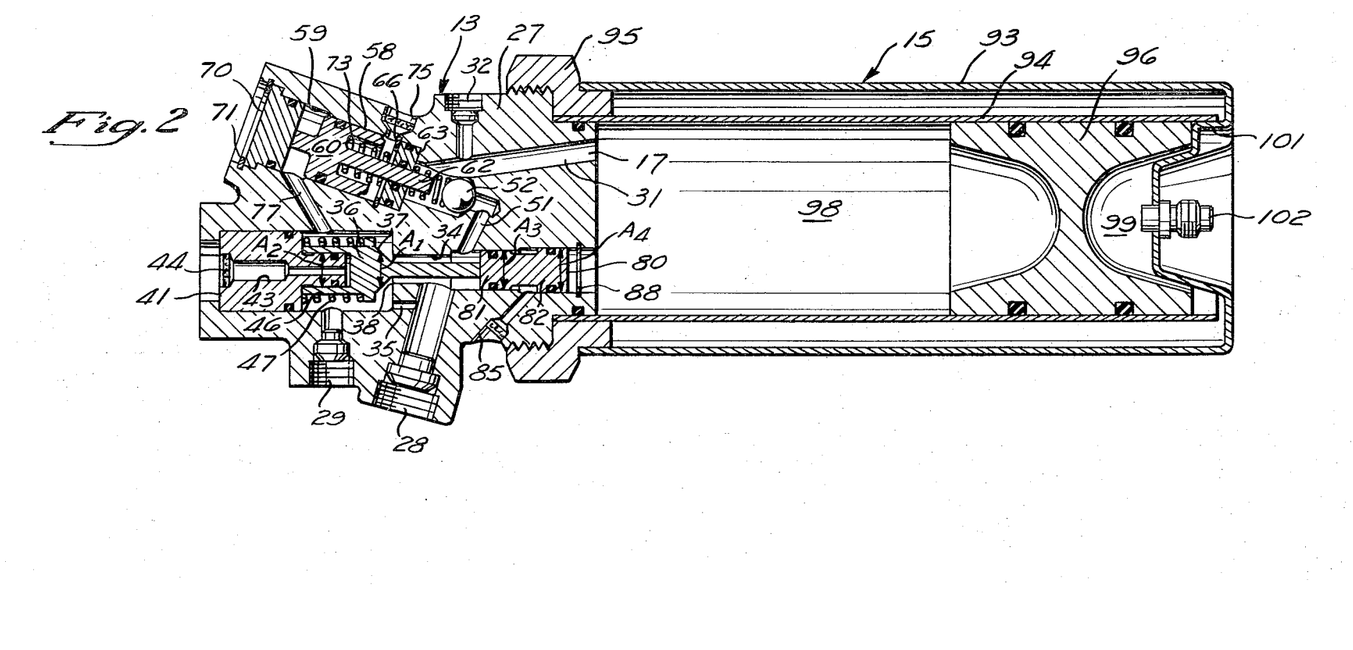
FIG. 2 is a cross-sectional side elevational view of a first embodiment of a control valve and accumulator for the fluid power circuit of FIG. 1.

Referring now to FIG. 2, a first embodiment of the control valve 13 and the accumulator 15 used in the circuit of FIG. 1 are shown. As shown in FIG. 2, the control valve 13 and the accumulator 15 are combined into a single unit.

The control valve 13 includes a housing 27 which may be formed of brass or other suitable material. The housing 27 includes an inlet port 28 which is hydraulically connected to the line 12 shown schematically in FIG. 1 to receive the entire output of the pump 11 under all conditions. The housing 27 also includes a first outlet port 29 for being hydraulically connected to the line 16 for supplying fluid to the steering valve 14. As explained in detail below, the first outlet port 29 also receives the feedback signal from the steering valve 14 shown schematically as reference numeral 18 in FIG. 1. The inlet port 28 and the first outlet port 29 are both provided with suitable insert members for cooperating connection with inverted flare-type fittings in a well known manner. The housing 27 is further provided with a second outlet port 31 for supplying fluid to the accumulator 15. Because the control valve 13 and the accumulator 15 are constructed as a unit in the embodiment shown in FIG. 2, the second outlet port 31 provides the line 17 shown in FIG. 1 leading from the control valve to the accumulator. A port 32 is provided for connection with the line 21 shown in FIG. 1 to hydraulically connect the accumulator 15 with the brake booster 22.

As shown in FIG. 2, a first passage 34 and a bleed passage 35 establish fluid pressure communication between the inlet port 28 and the first outlet port 29. A loading spool or poppet 36 is slidably disposed in the first passage 34 for movement between an open position illustrated in FIG. 2 for opening the first passage 34 and a closed position in which an annular valve head portion 37 of the loading spool 36 engages an annular valve seat 38 in the passage 34 to close the passage 34. When the spool 36 is in its closed position, a lateral cross-sectional area $A_1$ of the spool 36 is exposed to the fluid pressure in the inlet port 28.

A stationary plug 41 is disposed in the left end of the first passage 34, and the plug 41 carries a suitable seal for preventing fluid leakage between the plug 41 and the housing 27. The plug 41 is provided with a bore 43 extending axially from end-to-end therethrough, and the leftmost end of the bore 43 is provided with a suitable dust cap 44 which vents the bore 43 to atmospheric pressure while preventing dust and other foreign materials from entering the bore 43. The right end of the plug 41 terminates in a reduced diameter portion which is sealingly received within a skirt portion 46 of the loading spool 36. In this manner, an area $A_2$ of the spool 36 equal to the lateral cross-section area of the interior diameter of the skirt portion 46 is exposed to atmospheric pressure under all conditions. This area $A_2$ of the end of spool 36 which is exposed to atmospheric pressure is approximately equal to the area $A_1$ of the other end of spool 36 which is exposed to inlet port pressure when the valve head 37 engages the valve seat 38, so that the spool 36 has no effective area exposed to pressure in the first outlet port 29 when the spool 36 is closed. A loading spring 47 acts between the plug 41 and the loading spool 36 to exert a force $F_s$ to bias the loading spool 36 to the right from the open position shown in FIG. 2 to the closed position to load the pump 11 when the accumulator is being charged as described below.

A second passage 51 hydraulically connects the inlet port 28 to the second outlet port 31. A one-way ball-type check valve 52 cooperates with an annular shoulder in the second passage 51 to prevent return flow from the accumulator 15 to the inlet port 28. A suitable coil spring provides a biasing force to urge the ball-type check valve 52 to the closed position shown in FIG. 2.

A priority spool 58 is slidably disposed in an inclined stepped bore 59 in the housing 27. The priority spool 58 includes a larger diameter portion 60, which carries a suitable seal for sealing engagement with the smaller portion of the stepped bore 59. The priority spool 58 also includes a smaller diameter portion 62 which is slidably received within an annular insert member 63, and a suitable seal is provided to prevent fluid leakage between the smaller diameter portion 62 and the annular insert 63. The insert 63 is held in place against a shoulder in the bore 59 by a snap ring 66, and a suitable seal prevents fluid leakage between the insert 63 and the bore 59.

A stationary plug member 70 is held in place in the larger end of the inclined stepped bore 59 by a suitable snap ring 71, and fluid leakage between the plug 70 and the inclined bore 59 is prevented by a suitable seal. A biasing spring 73 acts against the priority spool 58 to urge the priority spool 58 to the left against the plug 70.

A suitable vent passage 75 exposes the cross-sectional differential area of the priority spool 58 (that is, the difference between the lateral cross-sectional area of the larger diameter portion 60 and the lateral cross-sectional area of the smaller diameter portion 62) to atmospheric pressure. A suitable dust cap is provided in the vent passage 75 which permits the passage of air through the vent passage 75 but prevents foreign materials such as dust from entering the inclined bore 59 through the vent passage 75. A priority passage 77 establishes fluid pressure communication between the pressure in the first outlet port 29 and the larger diameter end 60 of the priority spool 58. In this mannner, the larger diameter end 60 of the priority spool 58 is exposed to the fluid pressure of the steering valve 14 through the first outlet port 29, the smaller diameter end 62 of the priority spool 58 is exposed to accumulator pressure through the second outlet port 31, and the area differential between the portions 60 and 62 is exposed to atmospheric pressure through the vent passage 75.

An unloading spool 80 is slidably disposed in the right end of the first passage 34 as viewed in FIG. 2. The unloading spool 80 includes a smaller diameter portion 81 of lateral cross-sectional area $A_3$ which slides in a smaller diameter portion of the passage 34 and a larger diameter portion 82 of lateral cross-sectional area $A_4$ which slides in a larger diameter portion of the passage 34. Suitable seals are provided to prevent fluid leakage between the first passage 34 and the spool portions 81 and 82. The area differential of the unloading spool 80 (that is, the difference between the lateral cross-sectional area $A_4$ of the larger diameter portion 82 and the lateral cross-sectional area $A_3$ of the smaller diameter portion 81) is exposed to atmospheric pressure through a suitable vent passage 85. A suitable dust cap is provided in the vent passage 85 to prevent the infiltration of foreign materials through the vent passage 85. Movement of the unloading spool 80 to the right as viewed in FIG. 2 is limited by a suitable snap ring 88. In this manner, the smaller diameter portion 81 of the unloading spool 80 is exposed to inlet port pressure through the inlet port 28, the larger diameter portion 82 is exposed to accumulator through the right open end of the passage 34 (which provides the feedback signal indicated by reference numeral 19 in FIG. 1), and the area differential between the portions 81 and 82 is exposed to atmospheric pressure through the vent 85. For reasons discussed below, the lateral cross-sectional area $A_3$ of the spool 80 exposed to inlet port pressure is greater than the lateral cross-sectional area $A_1$ of the spool 36 exposed to inlet port pressure when the spool 36 is closed.

Referring still to FIG. 2, the accumulator 15 includes a housing 93 and a cylindrical chamber wall 94, both of which are secured such as by brazing to a suitable nut 95. The nut 95 is threadably secured to the housing 27 of the control valve 13, and a suitable seal is provided to prevent fluid leakage between the housing 27 and the accumulator 15. A free floating accumulator piston 96 is slidably disposed in the cylindrical chamber wall 94 and carries suitable seals for preventing fluid leakage from one side of the free floating piston 96 to the other side. The free floating piston 96 cooperates with the chamber wall 94 to define a fluid pressure storage chamber 98 on the left side of the piston 96 and a charge chamber 99 on the right side of the piston 96. The right end of the cylindrical chamber wall 94 is supported by a plurality of circumferentially spaced suitable indented portions 101 of the housing 93, one of which is shown in FIG. 2. However, the cylindrical chamber wall 94 does not engage the housing 93 about its entire peripheral extent at such right end, so that open fluid pressure communication is always maintained between the portion of the charge chamber 99 inside the chamber wall 94 and the portion of the charge chamber 99 interspaced between the chamber wall 94 and the housing 93.

A suitable charging port 102 is affixed to the housing 93 to permit charging the charge chamber 99 with a high pressure charging fluid. Because the area of the free floating piston 96 exposed to the fluid pressure storage chamber 98 is the same as the area of the piston 96 exposed to the charge chamber 99, the fluid pressure storage chamber 98 will be maintained at the same pressure as the pressure in the charge chamber 99. When the accumulator storage chamber 98 is fully charged with fluid, the free floating piston 96 is maintained by such fluid in the rightmost position shown in FIG. 2. As fluid from the storage chamber 98 is utilized by the brake booster 22 in a manner described below, the volume of the storage chamber 98 decreases and the free floating piston 96 moves to the left. As the free floating piston 96 moves to the left, the volume of the charge chamber 99 increases so that the pressure in the charge chamber 99 and in the storage chamber 98 is decreased.

Turning now to the operation of the unit shown in FIG. 2, it should be appreciated that the force urging the spools 36 and 80 to the right is the sum of the force $F_s$ of the spring 47 and the force $P_i A_3$ created by inlet port pressure $P_i$ acting on spool $A_3$. The force urging the spools 36 and 80 to the left is the sum of the force $P_i A_1$ created by inlet port pressure $P_i$ acting on spool area $A_1$ and the force $P_a A_4$ created by accumulator charge chamber pressure $P_a$ acting on spool area $A_4$. When these forces acting to the left on the spools 36 and 80 are equal to the forces acting to the right, $$P_i A_1 + P_a A_4 = F_s + P_i A_3.$$

The spools 36 and 80 are moved to the left to the positions shown in FIG. 2 when $(P_i A_1 + P_a A_4)$ is greater than $(F_s + P_i A_3)$ so that there is a net force acting to the left.

When the accumulator 15 is fully charged and the steering valve 14 is in its neutral position, the various components of the control valve 13 are in the positions shown in FIG. 2. Under these conditions the output fluid from the pump 11 is at a low pressure, and the entire output of the pump 11 flows through the line 12 to the inlet port 28, through the first passage 34, through the first outlet port 29, through the line 16, and through the open center steering valve 14 to the drain line 20. Because the high pressure $P_a$ in the fully charged accumulator storage chamber 98 is greater than this low pressure $P_i$ in the inlet port 28, the pressure in the chamber 98 retains the ball-type check valve 52 against its associated valve seat so that the flow of fluid from the inlet port to the accumulator storage chamber 98 is blocked. Additionally, because of this pressure differential, the sum ($P_i A_1 + P_a A_4$) is greater than the sum ($F_s + P_i A_3$) so that the unloading spool 80 engages the projecting end of the loading spool 36 and moves the loading spool 36 to its left or open position against the biasing force of the spring 47 under these conditions to unload the pump 11.

The circuit shown in FIG. 1 and the control valve shown in FIG. 2 will continue to function in this manner so long as the accumulator 15 remains fully charged and there is no restriction in the system imposed by the steering valve 14. When the steering valve 14 is actuated to restrict the flow of fluid to the drain line 20 and to divert at least some of the fluid from the line 16 to assist in the steering of the vehicle, the output pressure of the pump 11 is increased. This is because the output flow from the pump 11 is constant, and the output pressure must increase to get past the restriction imposed by the steering valve 14.

Under these conditions of increased pump pressure, the increased pump pressure is transmitted from the first outlet port 29 through the priority passage 77 and acts on the larger diameter end 60 of the priority spool 58. This pushes the priority spool 58 the the right against the bias of the spring 73 and against the force created by the accumulator pressure in the storage chamber 98 acting against the smaller diameter portion 62, so that the smaller diameter portion 62 holds the ball 52 against its associated seat. In this manner, even if the pump pressure in the inlet port 28 is greater than the fully charged pressure in the accumulator storage chamber 98, no fluid from the inlet port 28 will flow to the accumulator. This protects the accumulator against pump pressures which are greater than the maximum charge pressure of the accumulator, and directs the entire output of the pump 11 to the steering valve 14.

After the steering valve 14 returns to its neutral or center position, the pump output pressure returns to a low pressure, and the priority spool 58 is moved back to the position shown in FIG. 2 by the spring 73 and by the force of the accumulator pressure in the chamber 98 acting against the smaller diameter portion 62.

When the steering valve 14 is in the neutral position so that the pressure in the inlet port 28 is low and the pressure $P_a$ in the accumulator storage chamber 98 decreases below a predetermined minimum charge pressure, the forces on the right side of the above equation exceed the forces on the left side of the equation so that the spools 36 and 80 move to the right from the positions shown in FIG. 2. This causes the valve head portion 37 to engage the valve seat 38 to close the first passage 34. This imposes a restriction in the flow of fluid from the pump 11 and loads the pump 11 to increase the output pressure of the pump 11 until the pump pressure exceeds the pressure in the accumulator storage chamber 98. The increased pump pressure unseats the ball-type check valve 52, and fluid flows from the inlet port 28 into the accumulator storage chamber 98 to recharge the accumulator 15.

If, during the charging of the accumulator 15, the steering valve 14 is moved from its neutral position to impose a restriction between the line 16 and the drain line 20, the small amount of fluid flowing through the bleed passage 35 to the line 16 will cause the pressure in the first outlet port 29 to increase. This increased pressure is transmitted through the priority passage 77 and acts on the larger diameter end 60 of the priority spool 58 to move the priority spool 58 to the right from the position shown in FIG. 2 against the force of the spring 73 and the force of the accumulator pressure acting on the smaller diameter portion 62. This causes the smaller diameter portion 62 of the priority spool 58 to push the ball-type check valve 52 against the associated seat to close the passage 51 leading to the accumulator so that the charging cycle is interrupted. Because both the first passage 34 and the second passage 51 are closed when this occurs, the pressure in the inlet port 28 increases to a pressure sufficient to overcome the force of the spring 47 and move the loading spool 36 (which has its left end face exposed to atmospheric pressure through the vent passage 43) to the left to open the first passage 34 and supply the entire output of the pump 11 through the first outlet port 29 to the steering valve 14. The unloading spool 80 may move to the left with the spool 36 or may move to the right against the stop 88 when this occurs, depending upon the magnitude of the difference between the pressure in the inlet port 28 and the pressure in the accumulator storage chamber 98.

After the steering valve 14 then returns to its neutral position, the pressure in the first outlet port 29 and in the inlet port 28 is reduced because the flow restriction between the line 16 and the drain line 20 is thereby removed. This reduced pressure acting on the larger diameter portion 60 of the priority piston 58 causes the priority spool 58 to again be moved to the left by the force of the spring 73 and the force of the pressure in the accumulator storage chamber 98 acting against the smaller diameter portion 62. This permits the check valve 52 to reopen and permits the fluid from the inlet port 28 to again flow through the second passage 51. The loading spring 47 moves the loading spool 36 back to the right when this occurs to close the first passage 34 so that the fluid from the pump 11 flows to the accumulator 15 to complete the charging cycle of the accumulator.

When the pressure $P_a$ in the accumulator storage chamber 98 reaches the predetermined fully charged pressure, the left side of the above equation exceeds the right side so that the spools 36 and 80 begin to move to the left. As soon as the valve head portion 37 begins to move away from the valve seat 38, the pressure $P_i$ in the inlet port decreases. Because the area $A_3$ is greater than the area $A_1$, The right side of the equation is decreased more than the left side when $P_i$ is so decreased. This moves the spools 36 and 80 still further to the left so that inlet port pressure $P_i$ decreases still more. This causes what may be described as a "cascade effect," and results in very fast movement of the unloading spool 80 to the left when the accumulator is fully charged to preclude overcharging the accumulator 15. The fully charged pressure of the accumulator 15 may be changed by changing the force $F_s$ of the spring 47, as may be seen by algebraically solving the above equation for the term $F_s$.

Because the loading spool 36 and the unloading spool 80 are separate pieces, the control valve 13 is also operable to recharge the accumulator storage chamber 98 from a partially discharged condition. When the accumulator storage chamber 98 is at a partially discharged pressure (that is, a pressure less than the fully charged pressure but greater than the minimum charge pressure) and the steering valve 14 is in its neutral position so that the pump pressure is relatively low, the various components of the control valve 13 are in the positions shown in FIG. 2. When the steering valve 14 is actuated to restrict the flow of fluid to the drain line 20 and to divert at least some of the fluid from the line 16 to assist in the steering of the vehicle, the output pressure of the pump 11 is increased. Under these conditions of increased pump pressure, the increased pump pressure is transmitted from the first outlet port 29 through the priority passage 77 and acts on the larger diameter end 60 of the priority spool 58. This pushes the priority spool 58 to the right so that the smaller diameter portion 62 holds the ball 52 against its associated seat. Because the storage chamber 98 is partially discharged, the increased pressure in the inlet port 28 moves the unloading spool 80 to the right while retaining the loading spool 36 in its left position.

When the steering valve 14 returns to its neutral or center position, the pressure in the inlet port 28 and the outlet port 29 begins to decrease. This partially decreased pressure results in the loading spool 36 moving to the right to close the passage 34, and then the priority spool 58 moves back to the left by action of the spring 73. At this instant, the unloading spool 36 and the loading spool 80 are both in the right positions, and the ball-type check valve 52 is unseated by the pressure in the inlet port 28 (which is greater than the pressure in the partially discharged storage chamber 98) to recharge the storage chamber 98 from its partially discharged condition. When the storage chamber 98 is then fully charged, the loading spool 36 and unloading spool 80 move to the left in the "cascade" manner described above to again unload the pump 11. Thus, the control valve 13 will recharge the accumulator 15 under partially discharged conditions at the completion of a steering maneuver.

Second Embodiment of Control Valve and Accumulator

Figure 3:
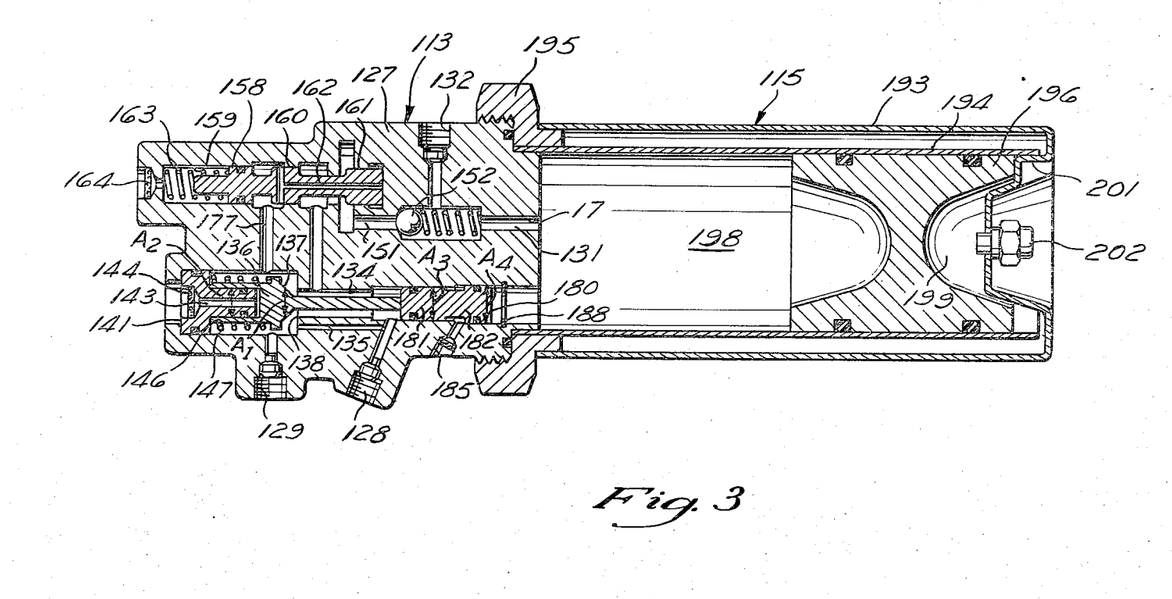
FIG. 3 is a cross-sectional side elevational view of a second embodiment of a control valve and accumulator for the fluid power circuit of FIG. 1.

A second embodiment of a control valve and an accumulator which may be used in the circuit of FIG. 1 in place of the control valve 13 and accumulator 15 is shown in FIG. 3. As shown in FIG. 3, a control valve 113 and an accumulator 115 are combined into a single unit.

The control valve 113 includes a housing 127 which may be formed of brass or other suitable material. The housing 127 includes an inlet port 128 which is hydraulically connected to the line 12 shown schematically in FIG. 1 to receive the entire output of the pump 11 under all conditions. The housing 127 also includes a first outlet port 129 for being hydraulically connected to the line 16 shown in FIG. 1 for supplying fluid to the steering valve 14. As explained in detail below, the first outlet port 129 also receives the feedback signal from the steering valve 14 shown schematically as reference numeral 18 in FIG. 1. The inlet port 128 and the first outlet port 129 are both provided with suitable insert members for cooperating connection with inverted flare-type fittings in a well known manner. The housing 127 is further provided with a second outlet port 131 for supplying fluid to the accumulator 115. Because the control valve 113 and the accumulator 115 are constructed as a unit in the second embodiment shown in FIG. 3, the second outlet port 131 provides the line 17 shown in FIG. 1 leading from the control valve to the accumulator. A port 132 is provided for connection with the line 21 in FIG. 1 to hydraulically connect the accumulator 15 with the brake booster 22.

As shown in FIG. 3, a first passage 134 and a bleed passage 135 establish fluid pressure communication between the inlet port 128 and the first outlet port 129. A loading spool or poppet 136 is disposed in the first passage 134 for movement between an open position illustrated in FIG. 3 for opening the first passage 134 and a closed position in which an annular valve head portion 137 of the loading spool 136 engages an annular valve seat 138 in the passage 134 to close the passage 134. When the spool 136 is in its closed position, a lateral cross-sectional area $A_1$ of the spool 136 is exposed to the fluid pressure in the inlet port 128.

A stationary plug 141 is disposed in the left end of the first passage 134, and the plug 141 carries a suitable seal for preventing fluid leakage between the plug 141 and the housing 127. The plug 141 is provided with a bore 143 extending axially from end-to-end therethrough, and the leftmost end of the bore 143 is provided with a suitable dust cap 144 which vents the bore 143 to atmospheric pressure while preventing dust and other foreign materials from entering the bore 143. The right end of the plug 141 terminates in a reduced diameter portion which is sealingly received within a skirt portion 146 of the loading spool 136. In this manner, an area $A_2$ of the spool 136 equal to the lateral cross-sectional area of the interior diameter of the skirt portion 146 is exposed to atmospheric pressure under all conditions. This area $A_2$ of the end of spool 136 which is exposed to atmospheric pressure is approximately equal to the area $A_1$ of the other end of the spool 136 which is exposed to inlet port pressure when the valve head 137 engages the valve seat 138 so that the spool 136 has no effective area exposed to pressure in the first outlet port 139 when the spool 136 is closed. A loading spring 147 acts between the plug 141 and the spool 136 to exert a force $F_s$ to bias the spool 136 to the right from the open position shown in FIG. 3 to the closed position to load the pump 11 when the accumulator is being charged as described below.

A second passage 151 hydraulically connects the inlet port 128 to the second outlet port 131. A one-way ball-type check valve 152 cooperates with an annular shoulder in the second passage 151 to prevent return flow from the accumulator 115 to the inlet port 128. A suitable coil spring provides a biasing force to urge the ball-type check valve 152 to the closed position shown in FIG. 3.

A priority spool 158 is slidably disposed in a bore 159 in the housing 127. The priority spool 158 includes a first valving land 160, a second valving land 161, and a passage 162 maintaining open fluid pressure communication between the first outlet port 129 and the right end face of the priority spool 158 under all conditions through a priority passage 177. A suitable seal is provided on the left end of the priority spool 158 for preventing leakage between the priority spool 158 and the housing 127, and a coil spring 163 biases the priority spool 158 to the right as shown in FIG. 3. A suitable dust cap 164 vents the left end of the priority spool 158 to atmospheric pressure under all conditions and prevents dust and other foreign materials from entering the bore 159. In this manner, the right end of the spool 158 is exposed to the fluid pressure of the steering valve 14 through the first outlet port 129, and the left end of the priority spool 158 is exposed to atmospheric pressure under all conditions.

An unloading spool 180 is slidably disposed in the right end of the first passage 134 as viewed in FIG. 3. The unloading spool 180 includes a smaller diameter portion 181 of lateral cross-sectional area $A_3$ which slides in a smaller diameter portion of the passage 134 and a larger diameter portion 182 of lateral crosssectional area $A_4$ which slides in a larger diameter portion of the passage 134. Suitable seals are provided to prevent fluid leakage between the first passage 134 and the spool portions 181 and 182. The area differential of the unloading spool 180 (that is, the difference between the lateral cross-sectional area $A_4$ of the larger diameter portion 182 and the lateral cross-sectional area $A_3$ of the smaller diameter portion 181) is exposed to atmospheric pressure through a suitable vent passage 185. A suitable dust cap is provided in the vent passage 185 to prevent the infiltration of foreign materials through the vent passage 185. Movement of the unloading spool 180 to the right as viewed in FIG. 3 is limited by a suitable snap ring 188. In this manner, the smaller diameter portion 181 of the unloading spool 180 is exposed to pump outlet pressure through the inlet port 128, the large diameter portion 182 is exposed to accumulator pressure through the right open end of the passage 134 (which provides the feedback signal indicated by reference numeral 19 in FIG. 1), and the area differential between the portions 181 and 182 is exposed to atmospheric pressure through the vent 185. For reasons discussed below, the lateral cross-sectional area $A_3$ of the spool 180 exposed to inlet port pressure is greater than the lateral cross-sectional area $A_1$ of the spool 136 exposed to inlet port pressure when the spool 136 is closed.

Referring still to FIG. 3, the accumulator 115 includes a housing 193 and a cylindrical chamber wall 194, both of which are secured such as by brazing to a suitable nut 195. The nut 195 is threadably secured to the housing 127 of the control valve 113, and a suitable seal is provided to prevent fluid leakage between the housing 127 and the accumulator 115. A free floating accumulator piston 196 is slidably disposed in the cylindrical chamber wall 194 and carries suitable seals for preventing fluid leakage from one side of the free floating piston 196 to the other side. The free floating piston 196 cooperates with the chamber wall 194 to define a fluid pressure storage chamber 198 on the left side of the piston 196 and a charge chamber 199 on the right side of the piston 196. The right end of the cylindrical chamber wall 194 is supported by a plurality of circumferentially spaced suitable indented portions 201 of the housing 193, one of which is shown in FIG. 3. However, the cylindrical chamber wall 194 does not engage the housing 193 about its entire peripheral extent at such right end, so that open fluid pressure communication is always maintained between the portion of the charge chamber 199 inside the chamber wall 194 and the portion of the charge chamber 199 interspaced between the chamber wall 194 and the housing 193.

A suitable charging port 202 is affixed to the housing 193 to permit charging the charge chamber 199 with a high pressure charging fluid. Because the area of the free floating piston 196 exposed to the fluid pressure of the accumulator storage chamber 198 is the same as the area of the piston 196 exposed to the charge chamber 199, the accumulator storage chamber 198 will be maintained at the same pressure as the pressure in the charge chamber 199. When the accumulator storage chamber 198 is fully charged with fluid, the free floating piston 196 is maintained by such fluid in the rightmost position shown in FIG. 3. As fluid from the storage chamber 198 is utilized by the brake booster 22 in a manner described below, the volume of the storage chamber 198 decreases and the free floating piston 196 moves to the left. As the free floating piston 196 moves to the left, the volume of the charge chamber 199 decreases so that the pressure in the charge chamber 199 and in the storage chamber 198 is decreased.

Turning now to the operation of the unit shown in FIG. 3, it should be appreciated that the force urging the spools 136 and 180 to the right is the sum of the force $F_s$ of the spring 147 and the force $P_i A_3$ created by inlet port pressure $P_i$ acting on spool area $A_3$. The force urging the spools 136 and 180 to the left is the sum of the force $P_i A_1$ created by inlet port pressure $P_i$ acting on spool area $A_1$ and the force $P_a A_4$ created by accumulator charge chamber pressure $P_a$ acting on spool area $A_4$. When these forces acting to the left on the spools 136 and 180 are equal to the force acting to the right, $$P_i A_1 + P_a A_4 = F_s + P_i A_3.$$

The spools 136 and 180 are moved to the left to the positions shown in FIG. 3 when $(P_i A_1 + P_a A_4)$ is greater than $(F_s + P_i A_3)$ so that there is a net force acting to the left, and the spools are moved to the right when $(P_i A_1 + P_a A_4)$ is less than $(F_s + P_i A_3)$ so that there is a net force acting to the right.

When the accumulator 115 is fully charged and the steering valve 14 is in its neutral position, the various components of the control valve 113 are in the positions shown in FIG. 3. Under these conditions the output fluid from the pump 11 is at a low pressure, and the entire output of the pump 11 flows through the line 12 to the inlet port 128, through the first passage 134, through the first outlet port 129, through the line 16, and through the open center steering valve 14 to the drain line 20. Because the high pressure $P_a$ in the fully charged accumulator storage chamber 198 is greater than the low pressure $P_i$ in the inlet port 128, the pressure in the storage chamber 198 retains the ball-type check valve 152 against its associated valve seat so that the flow of fluid from the inlet port 128 to the accumulator storage chamber 198 is blocked. Additionally, because of this pressure difference, the sum $(P_i A_1 + P_a A_4)$ is greater than the sum $(F_s + P_i A_3)$ so that the unloading spool 180 engages the projecting end of the loading spool 136 and moves the loading spool 136 to its left or open position against the biasing force of the spring 147 under these conditions to unload the pump 11.

The circuit shown in FIG. 1 and the control valve shown in FIG. 3 will continue to function in this manner so long as the accumulator 115 remains fully charged and there is no restriction in the system imposed by the steering valve 14. When the steering valve 14 is actuated to restrict the flow of fluid to the drain line 20 and to divert at least some of the fluid from the line 16 to assist in the steering of the vehicle, the output pressure of the pump 11 is increased. This is because the output flow from the pump 11 is constant, and the output pressure must increase to get past the restriction imposed by the steering valve 14.

Under these conditions of increased pump pressure, the increased pump pressure is transmitted from the first outlet port 129 through the priority passage 177 and the passage 162 in the priority spool 158 and acts on the right end of the priority spool 158 as viewed in FIG. 3. This pushes the priority spool 158 to the left against the bias of the spring 163 so that the left end of the priority spool 158 engages the control valve housing 127. When the priority spool 158 is in this position, the second valving land 161 isolates the inlet port 128 from the second passage 151 to block the flow of fluid from the inlet port 128 to the accumulator 115. When the priority spool 158 is in this left position, the groove interspacing the valving lands 160 and 161 opens a second flow path from the inlet port 128 to the outlet port 129 through the priority passage 177. In this manner, even if the pump pressure in the inlet port 128 is greater than the fully charged pressure in the accumulator storage chamber 198, no fluid will flow to the accumulator. This protects the accumulator 115 against pump pressures which are greater than the maximum charge pressure of the accumulator, and directs the entire output of the pump 11 to the steering valve 14 through the space between the valve head 137 and the shoulder 138 and through the priority passage 177.

After the steering valve 14 returns to its neutral or center position, the pump output pressure returns to a low pressure, and the priority spool 158 is moved back to the position shown in FIG. 3 by the spring 163.

When the steering valve 14 is in the neutral position so that the pressure in the inlet port 128 is low and the pressure $P_a$ in the accumulator storage chamber 198 decreases below a predetermined minimum charge pressure, the forces on the right side of the above equation exceed the forces on the left side of the equation so that the spools 136 and 180 move to the right from the positions shown in FIG. 3. This causes the valve head portion 137 to engage the valve seat 138 to close the first passage 134. This imposes a restriction in the flow of fluid from the pump 11 and loads the pump 11 to increase the output pressure of the pump 11 until the pump pressure exceeds the pressure in the accumulator storage chamber 198. This causes the fluid in the inlet port 128 to flow through the second passage 151, unseat the ball-type check valve 152, and flow into the accumulator storage chamber 198 to recharge the accumulator 115.

If, during charging of the accumulator 115, the steering valve 14 is moved from its neutral position to impose a restriction between the line 16 and the drain line 20, the small amount of fluid flowing through the bleed passage 135 to the line 16 will cause the pressure in the first outlet port 129 to increase. This increased pressure is transmitted through the priority passage 177 and the passage 162 in the priority spool 158 and acts on the right end face of the priority spool 158 to move the priority spool 158 to the left as viewed in FIG. 3. This causes the second valving land 161 to block the second passage 151 and isolate the accumulator storage chamber 198 from the inlet port 128. This also establishes a flow path from the inlet port 128, past the annular groove in the spool 158 interspacing the valving lands 160 and 161, and through the priority passage 177 to the first outlet port 129. The pressure in the inlet port 128 also acts against the loading spool 136 (which has a portion of its left end face exposed to atmospheric pressure through the passage 143 in the plug 141) so that the loading spool 136 moves to the left to open the first passage 134 if the pressure in the inlet port 128 becomes great enough to overcome the spring 147. In this manner, the charging of the accumulator storage chamber 198 is interrupted, and the entire output of the pump is directed to the steering valve 14 through the first outlet port 129. The unloading spool 180 may move to the left with the spool 136 or may move to the right against the stop 188 when this occurs, depending upon the magnitude of the difference between the pressure in the inlet port 128 and the pressure in the accumulator storage chamber 198.

After the steering valve 114 then returns to its neutral position, the pressure in the first outlet port 129 decreases. The spring 163 then returns the priority spool 158 to its right position shown in FIG. 3. The reduced fluid pressure in the first outlet port 129 also permits the spring 147 to move the loading spool 136 to the right to close the first passage 134. This permits the fluid from the inlet port 128 to again unseat the ball-type check valve 152 and flow to the accumulator storage chamber 198 to complete the charging cycle of the accumulator 115.

When the pressure $P_a$ in the accumulator storage chamber 198 reaches the predetermined fully charged pressure, the left side of the above equation exceeds the right side so that the spools 136 and 180 begin to move to the left. As soon as the valve head portion 137 begins to move away from the valve seat 138, the pressure $P_i$ in the inlet port decreases. Because the area $A_3$ is greater than the area $A_1$, the right side of the equation is decreased more than the left side when $P_i$ is so decreased. This moves the spools 136 and 180 still farther to the left so that inlet port pressure $P_i$ decreases still more. This causes what may be described as a "cascade effect," and results in a very fast movement of the unloading spool 180 to the left when the accumulator is fully charged to preclude overcharging the accumulator 115. The fully charged pressure of the accumulator 115 may be changed by changing the force $F_s$ of the spring 147 as may be seen by algebraically solving the above equation for the term $F_s$.

Because the loading spool 136 and the unloading spool 180 are separate pieces, the control valve 113 is also operable to recharge the accumulator storage chamber 198 from a partially discharged condition. When the accumulator storage chamber 198 is at a partially discharged pressure (that is, a pressure less than the fully charged pressure but greater than the minimum charge pressure) and the steering valve 14 is in its neutral position so that the pump pressure is relatively low, the various components of the control valve 113 are in the positions shown in FIG. 3. When the steering valve 14 is actuated to restrict the flow of fluid to the drain line 20 and to divert at least some of the fluid from the line 16 to assist in the steering of the vehicle, the output pressure of the pump 11 is increased. Under these conditions of increased pump pressure, the increased pump pressure is transmitted from the first outlet port 129 through the priority passage 177 and acts on the right end of the priority spool 158. This pushes the priority spool 158 to the left. Because the storage chamber 198 is partially discharged, the increased pressure in the inlet port 128 moves the unloading spool 180 to the right while retaining the loading spool 136 in its left position.

When the steering valve 14 returns to its neutral or center position, the pressure in the inlet port 128 and the outlet port 129 begins to decrease. This partially decreased pressure results in the loading spool 136 moving to the right to close the passage 134, and then the priority spool 158 moves back to the right by action of the spring 163. At this instant, the unloading spool 136 and the loading spool 180 are both in the right positions, and the ball-type check valve 152 is unseated by the pressure in the inlet port 128 (which is greater than the pressure in the partially discharged storage chamber 98) to recharge the storage chamber 198 from its partially discharged condition. When the storage chamber 198 is then fully charged, the loading spool 136 and unloading spool 180 move to the left in the "cascade" manner described above to again unload the pump 11. Thus, the control valve 113 will recharge the accumulator 115 under partially discharged conditions at the completion of a steering maneuver.

Brake Booster

Figure 4:
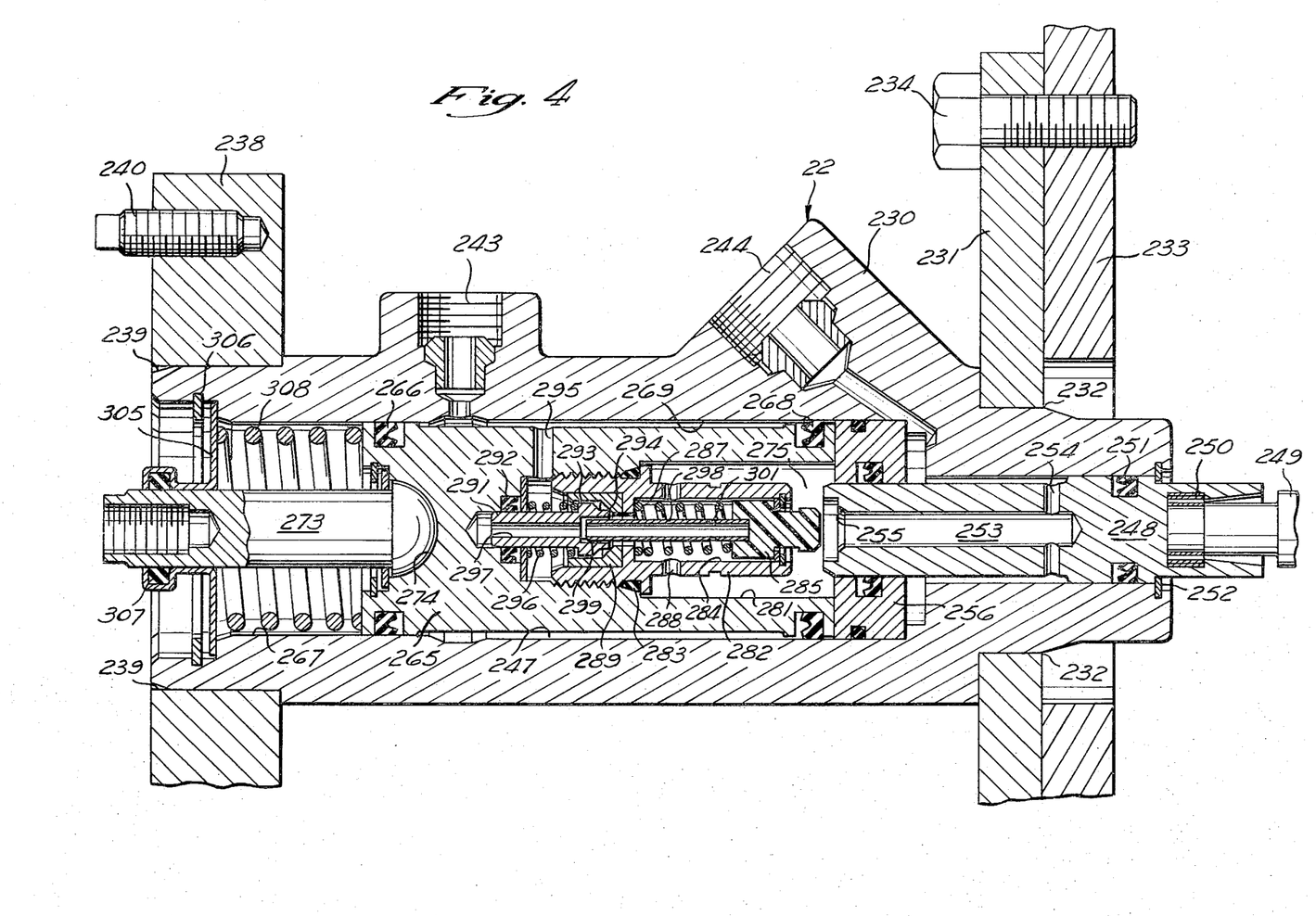
FIG. 4 is a cross-sectional side elevational view of the brake booster for the circuit of FIG. 1.

Turning now to FIG. 4, the preferred embodiment of the brake booster 22 is shown for the circuit of FIG. 1. The brake booster 22 includes a generally cylindrical axially extending housing 230. A first annular mounting flange 231 is suitably secured to the right or rearward end of the housing 230, such as by staking at a plurality of circumferentially spaced locations 232. The mounting flange 231 is secured to a firewall 233 of the motor vehicle by a plurality of suitable bolts 234, one of which is shown in FIG. 4. A second annular mounting flange 238 is secured to the left or forward end of the housing 230, such as by staking at circumferentially spaced locations 239. A plurality of threaded mounting rods 240 (one of which is shown in FIG. 4) are threadedly secured to the second mounting flange 238, and the master cylinder of the motor vehicle (not shown) is secured to the forward end of the brake booster 22 by the threaded mounting rods 240. In this manner, the brake booster 22 is interposed between the foot-operated brake pedal (not shown) of the motor vehicle and the master cylinder (not shown) to assist the operator in the application of the brakes in the manner discussed in detail below.

The housing 230 includes a threaded inlet port 243 which is hydraulically connected to the line 21 in FIG. 1 and a threaded outlet port 244 which is hydraulically connected to the drain line 20 in the circuit shown in FIG. 1. The ports 243 and 244 each include a suitable insert member to receive an inverted flare-type fitting in a well known manner.

As further shown in FIG. 4, a bore 247 extends axially from end-to-end through the housing 230. An input rod 248 is slidably disposed in the right end of the bore 247, and a connecting rod 249 is secured to the input rod 248 by a suitable retaining ring 250 to connect the brake pedal (not shown) to the input rod 248. A seal 251 prevents fluid leakage between the input rod 248 and the bore 247, and a snap ring 252 prevents the input rod 248 from being pulled out of the bore 247.

An axially extending blind bore 253 extends from one end of the input rod 248, and a radial passage 254 establishes open fluid pressure communication between the blind bore 253 and the outlet port 244 under all conditions. The annular end portion 255 of the input rod 248 which surrounds the blind bore 253 provides an annular valve seat as described in detail below. An annular rod support 256 guides and supports the left end of the input rod 248, and the rod support 256 carries suitable seals for preventing fluid leakage between the bore 247 and the rod support 256 and between the rod support 256 and the input rod 248.

A power piston 265 is also slidably disposed in the bore 247. A first seal 266 prevents fluid leakage between the power piston 265 and a bore portion 267 which extends between the left end of the housing 230 and the inlet port 243. In a similar manner, a second seal 268 is carried by the power piston 265 and prevents fluid leakage between the power piston 265 and a second bore portion 269 which extends between the inlet port 243 and the outlet port 244. For purposes explained below, the first bore portion 267 is of slightly smaller diameter than the second bore portion 269 so that the pressure in the inlet port 243 acts against a small differential area of the power piston 265 to produce a force on the power piston 265 urging it to the right as viewed in FIG. 4. The power piston 265 includes an output rod 273 at its left end for exerting a force on the master cylinder to which the brake booster 22 is connected. In the embodiment shown in FIG. 4, the output rod 273 is a separate rod which is secured in a spherical socket 274 of the power piston 265 by a suitable washer and retaining ring. Alternatively, the output rod 273 could be made as a single piece with the power piston 265. The right end of the power piston 265 cooperates with the bore portion 269 to define a power chamber 275.

The power piston 265 is a generally cup-shaped member having a blind bore 281 extending from its right end and a generally cylindrical carrier portion 282 threadedly secured in the bore 281. A suitable seal 283 prevents fluid leakage between the bore 281 and the carrier portion 282. The carrier portion 282 is a part of the power piston 265, but is made as a separate piece for manufacturing convenience.

The carrier portion 282 includes a bore 284 extending axially from end-to-end therethrough. A poppet 285 is slidably disposed in the bore 284 and is retained in the bore 284 by a suitable washer and retaining ring. A coil spring 287 biases the poppet 285 to the right as viewed in FIG. 4 against the washer and retaining ring. A radially extending passage 288 maintains open fluid pressure communication between the bore 284 and the power chamber 275 under all conditions, and a high pressure valve seat 289 is press-fit in the left end of the bore 284 as viewed in FIG. 4.

The brake booster 22 also includes a valve member 291. The left end of the valve member 291 is slidably supported in the left end of the bore 281, and a seal 292 prevents fluid leakage between the valve member 291 and the bore 281. The right end of the valve member 291 is slidably supported by the high pressure valve seat 289. A very loose fit is maintained between the high pressure valve seat 289 and the outer peripheral portion 293 of the valve member 291 to permit fluid flow therethrough, and a coil spring 296 biases the valve member 291 to the right as viewed in FIG. 4 so that a right end portion 294 of the valve member 291 engages the high pressure valve seat 289 to prevent the flow of fluid from the inlet port 243 through the brake booster. A radial passage 295 in the power piston 265 establishes open fluid pressure communication between the inlet port 243 and the upstream side of the valve member end portion 294. For purposes described in detail below, the outside diameter of the right end portion 294 is equal to the outside diameter of the portion of the valve member 291 which is engaged by the seal 292 so that the valve member 291 has a net lateral effective cross-sectional area of substantially zero exposed to the fluid pressure in inlet port 243 when the end portion 294 is held against the high pressure valve seat 289. Furthermore, the valve member 291 is provided with a bore 297 extending from end to end therethrough so that the valve member 291 also has a substantially zero net effective lateral cross-sectional area exposed to fluid pressure in the power chamber 275.

An actuator tube 298 extends between the poppet 285 and the valve member 291. The right end of the actuator tube 298 is press-fit in a suitable bore in the poppet 285 so that the actuator tube 298 moves with and may be considered a part of the poppet 285 under all conditions. The left end of the actuator tube 298 is loosely slidably carried by the valve member 291. When the brake booster 22 is in the position shown in FIG. 4, the left end of the actuator tube 298 is spaced from a shoulder 299 of the valve member 291. This small distance between the left end of the actuator tube 298 and the shoulder 299 provides a lost motion connection between the poppet 285 and the valve member 291. As discussed below, this insures that the power chamber 275 is isolated from the outlet port 244 before inlet port 243 is connected to the power chamber 275 when the brakes are applied, and insures that the power chamber 275 is isolated from the inlet port 243 before the power chamber 275 is connected to the outlet port 244 when the brakes are released. A suitable opening 301 is also provided in the wall of the actuator tube 298 to maintain open fluid pressure communication between the interior of the actuator tube 298 and the power chamber 275 under all conditions.

An end cap 305 is retained on the left end of the housing 230 by a suitable retaining ring 306. The end cap 305 carries a sealing ring 307 which prevents infiltration of dirt or other contaminants into the left end of the bore 247. A coil spring 308 acts between the end cap 305 and the power piston 265. As explained in detail below, the coil spring 308 urges the power piston 265 back to he right as viewed in FIG. 4 after the brake booster 22 has been actuated and the brakes have been released.

When the brake pedal of the motor vehicle is released so that there is no input force acting to the left on the input rod 248, the brake booster 22 assumes the position shown in FIG. 4. Under these conditions, the portions of the brake booster 22 upstream of the valve member end portion 294 are exposed to accumulator pressure through the inlet port 243, and the portions of the brake booster 22 downstream of the valve member end portion 294 are exposed to drain line pressure (which is at or below atmospheric pressure) through the outlet port 244. When the vehicle operator applies a force through the brake pedal to the input rod 248, the input rod 248 moves to the left so that the annular valve seat 255 engages the poppet 285 to isolate the power chamber 275 from the outlet port 244. To move the input rod 248 further to the left after the poppet 285 is engaged, the force of the spring 287 must be overcome so that the spring 287 retains the poppet 285 against the valve seat 255. In this manner, the lost motion connection described immediately above between the poppet 285 and the valve member 29 insures that the power chamber is isolated from the outlet port 244 before the inlet port 243 can be hydraulically connected to the power chamber 275.

As the input rod 248 and the poppet 285 (which carries the actuator tube 298 as discussed above) continue to move to the left against the bias of the spring 287, the left end of the actuator tube 298 engages the shoulder 299 of the valve member 291. When this occurs, further movement of the input rod 248 and the poppet 285 and the actuator tube 298 to the left displaces the valve member 291 to the left against the bias of the spring 296 to separate the valve member end portion 294 from the high pressure valve seat 289. This establishes throttled fluid pressure communication between the inlet port 243 (which receives pressure from the accumulator 15 through the line 21) and the power chamber 275. Because the valve member 291 has a net effective lateral cross-sectional area of substantially zero exposed to the high pressure in the inlet port 243, there is no force created by this high pressure acting against either the valve member 291 or against the poppet 285 which would have to be overcome in order to separate the valve member end portion 291 from the high pressure valve seat 289.

The high pressure from the accumulator is throttled through the annular area between the separated valve member end portion 294 and high pressure valve seat 289 so that a lower pressure enters the power chamber 275 (which, as described above, has been isolated from the outlet port 244 by the valve head 255 and the poppet 285). This reduced fluid pressure in the power chamber 275 acts on the net effective lateral cross-sectional area of the power piston 265 (which is the difference between the lateral cross-sectional area of the second bore portion 269 and the lateral cross-sectional area of the valve head 255) to displace the power piston 265 to the left as viewed in FIG. 4 so that the output rod 273 applies a force on the motor vehicle master cylinder.

Because the right side of the poppet 285 is exposed to drain line pressure (which is at or below atmospheric pressure) while the left side of the poppet 285 is exposed to the fluid pressure in the power chamber 275, the pressure in the power chamber 275 maintains the poppet 285 against the valve head 255, so that the poppet 285 and the actuator tube 298 do not move to the left with the power piston 265 but instead stay in position against the valve head 255. If the motor vehicle operator does not push the input rod 249 any further to the left when this occurs so that the input rod 249 remains stationary, this causes the poppet 285 and the actuator tube 298 to remain stationary as the power piston 265 moves to the left. Because the valve member 291 has substantially no net effective cross-sectional area exposed to the inlet port pressure and substantially no net effective cross-sectional area exposed to the pressure of the power chamber 275, the spring 296 retains the valve member 291 against the left end of the actuator tube 298 so that the valve member 291 also remains stationary as the power piston moves to the left. This continues until the high pressure valve seat 289 engages the valve member end portion 294 to again block off flow from the inlet port 243 to the power chamber 275. Because no further fluid flows into the power chamber 275 through the inlet port 243 or out of the power chamber 275 through the outlet port 244 when this occurs, the power piston 265 stops and remains stationary to provide a constant force on the master cylinder until the vehicle operator applies the brakes more forcefully or releases the brakes. Because the pressure in the power chamber 275 acts against the entire left end of the poppet 285 and the input rod 248, a feedback signal is provided through the input rod 248 to the brake pedal which is directly proportional to the pressure in the power chamber 275 (that is, as the pressure in the power chamber 275 increases, this force of the pressure acting against the input rod 248 also increases), and the motor vehicle operator is thereby able to feel through the brake pedal the force that is being applied to the master cylinder.

If the motor vehicle operator wishes to apply the brakes of the motor vehicle more forcefully, he applies a greater force on the brake pedal to again displace the input rod 248 further to the left. This again pushes the poppet 285 (which is still held in place against the seat 255 by the spring 287 and by the pressure in the power chamber 275) and the actuator tube 298 to the left. This causes the left end of the actuator tube 298 to again engage the valve member shoulder 299 to push the valve member end portion 294 away from the high pressure valve seat 289. This permits further flow of fluid from the inlet port 243 through the throttling area between the end portion 294 and the high pressure valve seat 289 and into the power chamber 275. This further pressure pushes the power piston 265 further to the left to increase the braking of the motor vehicle. Such movement of the power piston 265 to the left, as explained above, moves the high pressure valve seat 289 to the left while the valve member 291 remains stationary to close the valve.

When maximum braking force is applied to the brake pedal by the motor vehicle operator, the input rod 248 moves further and further to the left, as does the power piston 265 and the output rod 273. This continues until the master cylinder of the motor vehicle is fully depressed, so that the master cylinder provides a positive stop for preventing further movement of the output rod and power piston 265 to the left. When this occurs so that movement of the power piston 265 to the left is no longer possible, the force on the input rod 248 holds the poppet 285 and the actuator tube 298 and the valve member 291 to the left so that the valve member end portion 294 remains spaced from the high pressure valve seat 289 to maintain open fluid pressure communication between the inlet port 243 and the power chamber 275. This applies full accumulator pressure to the power chamber 302 for maximum braking.

When the motor vehicle operator wishes to partially but not fully release the brakes, the force on the brake pedal is reduced. When this occurs, the fluid pressure in the power chamber 275 will move the input rod 248 to the right as viewed in FIG. 4 to separate the annular valve seat 255 from the poppet 285. This establishes throttled fluid pressure communication between the power chamber 275 and the outlet port 244 through the blind bore 253 and the radial passage 254. As the pressure in the fluid power chamber 275 is reduced, the reaction force of the motor vehicle master cylinder pushes the output rod 273 and the power piston 265 to the right so that the poppet 285 again sealingly engages the annular valve seat 255 to again isolate the power chamber 275 from the outlet port 244. In this manner, the fluid pressure in the power chamber 275 is reduced so that the braking force applied to the master cylinder is reduced. The lost motion connection between the valve member 291 and the actuator tube 298 described above assures that the valve member end portion 294 will be seated against the high pressure valve seat 289 before the annular valve seat 255 is separated from the poppet 285 when the brakes are released.

When the motor vehicle operator wishes to fully release the brakes, the force exerted on the brake pedal is released. This permits the pressure in the fluid pressure chamber 275 to push the input rod 248 to the right as viewed in FIG. 4 to again separate the annular valve seat 255 from the poppet 285. This further reduces the pressure in the fluid power chamber 275, and causes the power piston 265 and the input rod 248 to move to the right until the fully released positions shown in FIG. 4 are reached.

As described above, the inlet port 243 is always exposed to the high fluid pressure of the accumulator 15. Because this high fluid pressure is always present in the portions of the booster upstream of the valve member 291 towards the accumulator 15, the seals 266 and 268 are always exposed to the high pressure from the accumulator. This high pressure forces the seals 266 and 268 radially outwardly against the first and second bore portions 267 and 269, respectively. This creates a substantial frictional force between the seals 266 and 268 and the bore portions 267 and 269, respectively, so that a substantial force is required to return the power piston 265 to the right as viewed in FIG. 4. Although the spring 308 assists in this return of the power piston 265, the force of the spring 308 must be overcome when the brakes are being applied and the power piston 265 is being moved to the left, so that it is desirable to make the spring 308 of minimum preload and minimum spring rate. For this reason, the bore portion 269 is slightly larger than the bore portion 267, as described above. This provides a slight area differential on the power piston 265 (that is, the area differential between the first bore portion 267 and the second bore portion 269) which is exposed to the high accumulator pressure. The pressure of the fluid in the inlet port 243 acting against this small differential area urges the power piston 265 to the right as viewed in FIG. 4. This provides a return force to return the power piston 265 to the right when the force on the brake pedal is reduced or released.

In the event of a fluid pressure failure in the circuit so that the accumulator 15 does not supply high pressure fluid to the inlet port 243, the brakes of the vehicle are actuated manually without the power assist. In this event, movement of the input rod 248 to the left as viewed in FIG. 4 by application of a force to the brake pedal causes the left end face of the input rod 248 to engage the right end face of the power piston carrier member 282. This provides a direct mechanical engagement of the input rod 248 to the power piston 265 so that the input rod 248 moves the power piston 265 to the left as viewed in FIG. 4 to actuate the motor vehicle master cylinder. Of course, in this event of fluid pressure failure, the force which must be applied to the brake pedal by the motor vehicle operator is substantially increased. When the brake pedal is released, the coil spring 308 provides a sufficient force to return the power piston 265 to the right as viewed in FIG. 4 because there is no high pressure in the inlet port 243 acting against the seals 266 and 268 to provide a substantial frictional resistance to such return movement.

What is claimed is:

1. In a motor vehicle fluid power circuit having a fluid pump, a steering gear, a brake booster, and an accumulator, a control valve; said control valve including a housing having an inlet port for receiving fluid from said fluid pump, a first outlet port for supplying fluid to said steering gear, a second outlet port for supplying fluid to said accumulator, a first passage hydraulically connecting said inlet port to said outlet port, a second passage hydraulically connecting said inlet port to said second outlet port, a first spool movable between an open position for opening said first passage and a closed position for closing said first passage, a spring biasing said first spool to said closed position, a second spool slidably disposed in a bore, said second spool including a first portion exposed to fluid inlet port pressue and a second portion of greater lateral cross-sectional area than said first portion exposed to accumulator pressure, and said second spool being movable in said bore by application to said first and second portions of a predetermined pressure in said inlet port and said accumulator to engage said first spool and move said first spool against the bias of said spring from said closed position to said open position.

2. A control valve in accordance with claim 1 wherein said first spool includes a portion exposed to atmospheric pressure under all conditions.

3. A control valve in accordance with claim 2 wherein said first spool includes another portion exposed to inlet port pressure when said first spool is in said closed position.

4. A control valve in accordance with claim 3 wherein the lateral cross-sectional area of said other portion of said first spool is less than the lateral cross-sectional area of said first portion of said second spool, whereby a decrease in said inlet port pressure decreases the net force opposing movement of said first spool from said closed position to said open position.

5. A control valve in accordance with claim 4 wherein the preload of said spring is equal to the product of said predetermined pressure multiplied times the sum of said lateral cross-sectional area of said other portion of said first spool and said lateral cross-sectional area of said second portion of said second spool minus the product of said predetermined pressure multiplied times the lateral cross-sectional area of said first portion of said second spool.

6. A control valve in accordance with claim 1 including a one-way check valve in said second passage for blocking fluid flow in a direction from said second outlet port to said inlet port.

7. A control valve in accordance with claim 1 including a bleed passage between said inlet port and said first outlet port for maintaining a small flow of fluid from said inlet port to said first outlet port under all conditions.

8. A control valve in accordance with claim 7 including a priority piston, said priority piston being movable between a first position and a second position, said priority piston closing said second passage when said priority piston is in said second position, and said priority piston including a lateral cross-sectional area exposed to the fluid pressure of said first outlet port, whereby the force of said first outlet fluid pressure acting against said priority piston area moves said priority piston from said first position to said second position.

9. A control valve in accordance with claim 8 wherein said priority piston includes another lateral cross-sectional area exposed to atmospheric pressure.

10. A control valve in accordance with claim 9 including a one-way check valve in said second passage, said one-way check valve being movable between an open position and a closed position for preventing the flow of fluid in a direction from said accumulator to said inlet port, and said priority piston retaining said one-way check valve in said closed position when said priority piston is in said second position.

11. A control valve in accordance with claim 9 wherein said priority piston includes means to open a bypass passage around said poppet from said inlet port to said first outlet port when said priority piston is in said second position.

12. In a motor vehicle fluid power circuit having a fluid pump, a steering gear, a brake booster, and an accumulator, a control valve; said control valve including a housing having an inlet port for receiving fluid from said fluid pump, a first outlet port for supplying fluid to said steering gear, a second outlet port for supplying fluid to said accumulator, a first passage hydraulically connecting said inlet port to said first outlet port, a second passage hydraulically connecting said inlet port to said second outlet port, a valve seat in said first passage intermediate said inlet port and said first outlet port, a poppet axially movable between an open position axially spaced from said valve seat and a closed position axially engaging said valve seat for closing said first passage, a spring biasing said poppet to said closed position, a differential area piston slidably disposed in a bore, said differential area piston including a first end exposed to fluid inlet port pressure and a second end of greater lateral cross-sectional area than said first end exposed to accumulator pressure, and said differential area piston being movable in said bore by application to said first and second ends of a predetermined pressure in said inlet port and said accumulator to engage said poppet and move said poppet against the bias of said spring from said closed position to said open position.

13. A control valve in accordance with claim 12 wherein said poppet includes an end portion exposed to fluid inlet port pressure, and said poppet end portion is of smaller lateral cross-sectional area than said first end of said differential area piston whereby a decrease in fluid inlet port pressure decreases the net force urging said poppet to said closed position.

14. In a motor vehicle fluid power circuit having a fluid pump, a steering gear, a brake booster, and an accumulator, a control valve; said control valve including a housing having an inlet port for receiving fluid from said fluid pump, a first outlet port for supplying fluid to said steering gear, a second outlet port for supplying fluid to said accumulator, a bore extending through said housing and hydraulically connecting said inlet port to said first outlet port, a passage hydraulically connecting said inlet port to said second outlet port, a valve seat in said bore intermediate said inlet port and said first outlet port, a poppet slidably disposed in one end of said bore for axial movement between an open position axially spaced from said valve seat and a closed position axially engaging said valve seat, said poppet including a first end exposed to atmospheric pressure and a second end exposed to fluid inlet port pressure, a spring biasing said poppet to said closed position, a differential area piston slidably disposed in the other end of said bore in axially aligned relationship with said poppet, said differential area piston including a first end exposed to fluid inlet port pressure and a second end of greater lateral cross-sectional area than said first end exposed to accumulator pressure and a differential area exposed to atmospheric pressure, said differential area piston being movable in said bore by application of a predetermined pressure in said inlet port and said accumulator to said first and second differential area piston ends to axially engage said poppet and move said poppet against the bias of said spring from said closed position to said open position, and said second end of said poppet being of smaller lateral cross-sectional area than said first end of said differential area piston whereby a decrease in fluid inlet port pressure decreases the net force urging said poppet to said closed position.

* * * * *

UNITED STATES PATENT OFFICE
CERTIFICATE OF CORRECTION

Patent No. 3,834,162　　　　　　　　Dated September 10, 1974

Inventor(s) Frederick D. Keady

It is certified that error appears in the above-identified patent and that said Letters Patent are hereby corrected as shown below:

On the title page, "Value" should be "Valve" in the title.

Column 1, line 19, After the word "braking" please change "," to --.--.

Column 1, line 24, "pressures" should be --pressure--.

Column 1, line 26, After the word "valve" please change "is" to --if--.

Column 3, line 9, After the word "to" insert --a--.

Column 5, line 51, After the word "accumulator" insert --pressure--.

Column 7, line 2, After the word "port" insert --28--.

Column 7, line 26, After the number "58" and before the word "the" please change "the" to --to--.

Column 8, line 8, After the word "against" please change "the" to --its--.

Column 8, line 49, After the symbol "$A_1$" please change "The" to --the--

Column 17, line 44, After the word "to" please change "he" to --the--.

Column 21, line 11, After the word "said" and before the word "outlet" insert --first--.

UNITED STATES PATENT OFFICE
CERTIFICATE OF CORRECTION   Page 2

Patent No. 3,834,162          Dated September 10, 1974

Inventor(s) Frederick D. Keady

It is certified that error appears in the above-identified patent and that said Letters Patent are hereby corrected as shown below:

Continued from first page

Column 21, line 19, "sue" should be --sure--.

Signed and sealed this 3rd day of December 1974.

(SEAL)
Attest:

McCOY M. GIBSON JR.                C. MARSHALL DANN
Attesting Officer                  Commissioner of Patents